June 13, 1939.  J. E. SNYDER  2,162,184
PIPE COUPLING
Filed Jan. 14, 1938
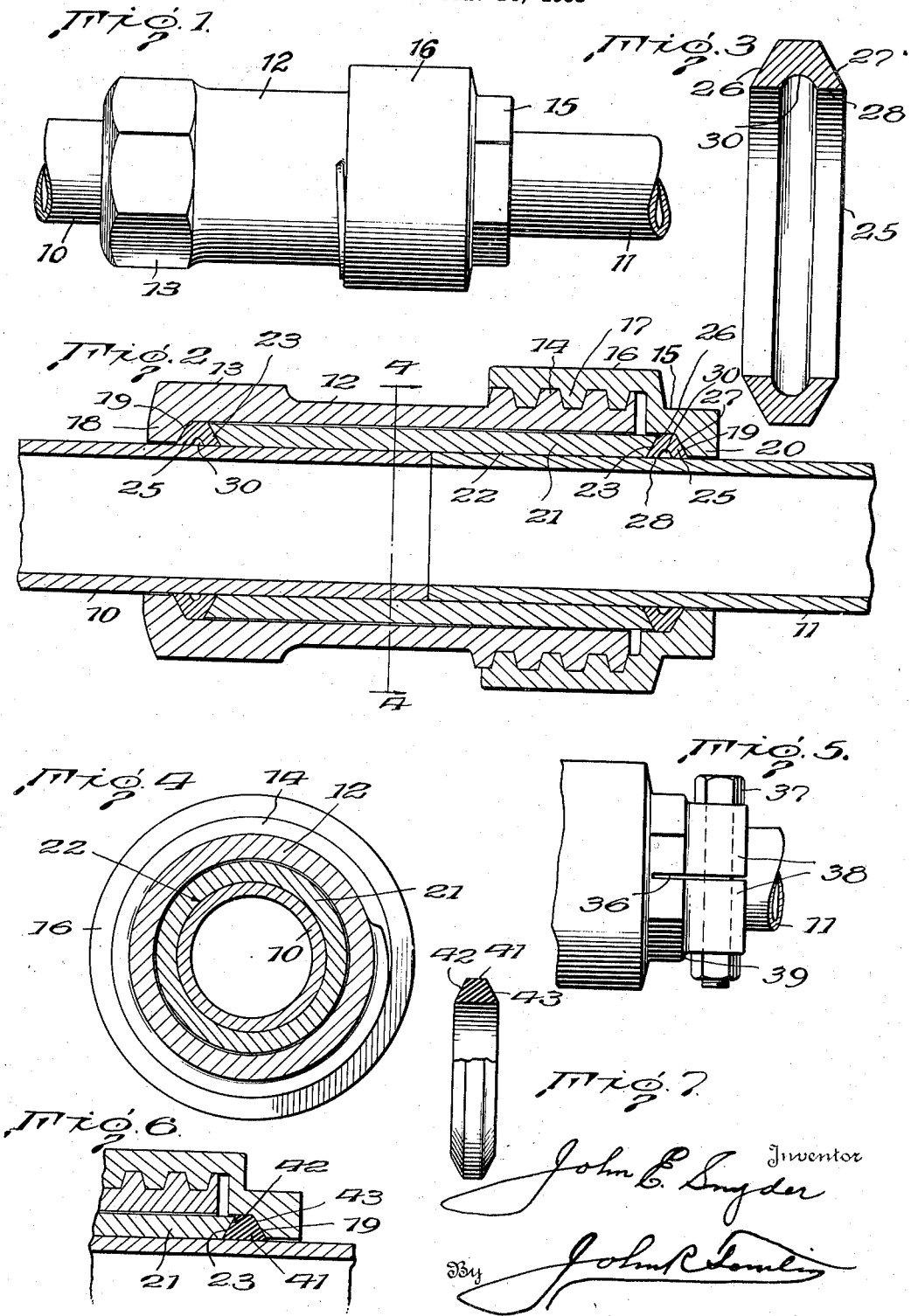

Patented June 13, 1939

2,162,184

UNITED STATES PATENT OFFICE 2,162,184

PIPE COUPLING

John E. Snyder, Lansing, Mich.

Application January 14, 1938, Serial No. 185,075

1 Claim. (Cl. 285—196)

This invention relates to pipe couplings, and more particularly to couplings for securing the meeting or adjacent ends of pipes in a line without the necessity of threading said pipes or the removal of the same from their fastenings in the pipe line.

An object of this invention is to provide a pipe coupling in which the terminals of adjacent pipe sections are received within an alining member or non-corrosive sleeve cooperating with sealing and clamping components to provide a leaktight conduit to prevent the fluid conveyed through the pipe sections from engaging the clamping components of the coupling.

A more specific object of this invention is to provide a pipe coupling which includes a non-corrosive sleeve to be positioned around the adjacent terminals of separate pipe sections to thereby aline the pipe sections preparatory to the assembling of the components of the coupling, annular sealing members or gaskets surrounding the pipe sections and engaging the terminals of the sleeve, threadedly connected clamping members surrounding the sleeve, securing gaskets and pipe sections and operably engaging the gaskets to form a leak tight joint around the sleeve terminals to prevent the contents of the pipe sections engaging the clamping members of the coupling.

An additional object of this invention is to provide an improved sealing member or gasket for use in pipe couplings to cooperate with clamping components to provide a leak-tight joint around the coupled pipe sections.

It is also an object of this invention to provide a pipe coupling of generally improved construction and arrangement whereby the device will be simple, durable and inexpensive in construction, as well as convenient, practical, serviceable and efficient in its use.

With the foregoing and other objects in view which will appear as the description proceeds, the invention resides in the combination and arrangement of parts, and in the details of construction hereinafter described and claimed, it being understood that various changes in form, proportions and details of construction may be resorted to without departing from the spirit or sacrificing any advantages of the invention.

For a complete disclosure of the invention, a detailed description of the improved pipe coupling will now be given in connection with the accompanying drawing forming a part of the specification, wherein:

Figure 1 is an elevational view of the improved pipe coupling depicted in assembled position on a pipe line, Figure 2 is an enlarged longitudinal section taken through the pipe coupling and adjacent pipe or conduit terminals, the components of the coupling being shown in assembled relation, Figure 3 is an enlarged cross sectional view taken through a sealing member or gasket, Figure 4 is a transverse sectional view taken on the line 4—4 of Figure 2, Figure 5 is an elevational view depicting a slightly modified clamping member, Figure 6 is a fragmental longitudinal sectional view depicting the use of a resilient gasket or sealing member, and Figure 7 is an elevational view, partly in section, depicting the rubber or resilient gasket.

Referring to the drawing in which similar reference characters designate corresponding parts, 10 and 11 indicate the adjacent terminals of separate pipe sections forming components of a pipe line on which the improved pipe coupling is to be positioned. The coupling includes a clamping component which is in the form of a cylindrical shell 12 having a polygonal wrench engaging surface 13 formed exteriorly thereon at one terminal and the opposed terminal of the shell 12 is provided with external threads 14 preferably cast in their final form in the production of the shell. A second clamping component is provided and includes a cylindrical shell or body 16 which is internally threaded, as indicated at 17, for operable cooperation with the threads 14 of the clamping shell 12. The outer terminal of the clamping shell 12 is provided with an inwardly extending annular clamping shoulder or member 18, and a similar clamping member or shoulder 20 is formed at the outer terminal of the internally threaded clamping member 16, and these clamping members 18 and 20 are constructed and arranged for operable cooperation with components to be hereinafter disclosed, and, to this end, the annular shoulders 18 and 20 are provided with frusto conical gasket engaging surfaces 19. In order that the second clamping component or member 16 may be held against rotation, or rotated relative to the first clamping member 12, polygonal wrench engaging surfaces 15 are provided exteriorly of the annular clamping member 20.

The adjacent terminals of the pipe sections 10 and 11 are received within a cylindrical sleeve 21, and the bore or inner surface 22 of this sleeve engages the outer surface of the pipe sections to hold them in substantially axial alinement preparatory to the assembling of the components of the coupling, as will be hereinafter explained. Each terminal of the alining sleeve 21 is provided with a frusto conical surface 23 which engages a gasket 25. Each gasket 25 is in the form of an annulus having opposed frusto conical terminal surfaces 26 and 27, and the inner cylindrical surface 28 of the gasket is interrupted by an annular recess 30. Each gasket 25 is preferably formed of lead, copper, or other relatively soft yieldable noncorrosive metal so that it may yield responsive to clamping pressure to provide a tight leak-proof seal around each pipe section, as will be more fully explained hereinafter. The sleeve 21 is also preferably formed of copper, brass, bronze, galvanized metal or other noncorrosive material for a purpose which will also be herein explained.

In positioning the coupling in locations affording free axial movement to couple or join the adjacent terminals of separate pipe sections, the coupling, with its components loosely assembled, may be positioned around the terminal of one pipe section and then slid along this section until the terminal of the pipe is exposed. The adjacent pipe is then moved into axial alinement with the first mentioned pipe section and the assembled coupling is then slid over the terminal of the second pipe section until its intermediate portion is located at the adjacent or abutting terminals of the pipe sections. Wrenches or other suitable tools are then positioned on the wrench engaging surfaces 13 and 15 to rotate the clamping members 12 and 16 relative to each other to cause them to move axially inward. The inward movement of the clamping members 12 and 16 causes the frusto conical surfaces 19 of the annular clamping shoulders 18 and 20 to engage the outer frusto conical surfaces 27 of the gasket 25, and the continued inward movement of the clamping member forces the inner frusto conical surfaces 26 of the gaskets 25 against the frusto conical surfaces 23 formed at the terminals of the sleeve 21. The angular disposition of the frusto conical gasket-engaging surfaces 23 of the sleeve 21, surfaces 26 and 27 of the gaskets 25, and the surfaces 19 of the clamping shoulders 18 and 20 causes the clamping movement of the clamping members 12 and 16 to force the yieldable gaskets 25 inwardly into binding or sealing engagement with the outer surface of the pipe sections 10 and 11 to thus produce a leak tight seal or joint around the pipe sections at these points. The annular groove 30 formed within each gasket 25 reduces the resistance which would normally be offered by the uninterrupted inner surface of the gasket 25 to permit the axial terminals of the gasket to bend inwardly and bind against the peripheral surface of the pipe to provide a liquid tight seal.

This improved coupling is of peculiar advantage in coupling separate pipe sections or repairing a damaged pipe in the pipe line which contains or conveys corrosive fluid. In the use of ordinary couplings in repairing or coupling pipe lines which convey corrosive fluid, this fluid attacks the clamping or securing components of the coupling thereby causing them to corrode so that it is frequently necessary to destroy the coupling or components thereof in order to disassemble it. In applicant's disclosed arrangement, however, when the coupling is employed on pipe lines which convey corrosive fluid, the sleeve 21 is formed of noncorrosive material, and, inasmuch as the sealing gaskets 25 engage the opposed terminals of the sleeve 21 to form leak-tight joints at these terminals, it is manifest that no fluid reaches the threads 14 and 17 of the clamping members 12 and 16 thus protecting these elements against corrosion which would normally be produced by the corrosive fluid leaking from the pipe to the clamping elements. If the coupling is to be employed in muddy or corrosive soil, then after the coupling has been assembled it may be given a coat of water proof paint or other suitable covering to protect the external surfaces of the coupling against corrosive action of the soil. Since there are only two clamping members employed in this improved coupling it is manifest that the clamping components may be readily assembled and the coupling locked in position on the selected sections of the pipe line. In removing the coupling from the pipe line, the outer clamping member 16 is moved relative to the inner clamping member 12, thus relieving the clamping pressure on the yieldable gaskets 25, and then the entire coupling may be removed from the pipe line by first sliding it in one direction until a pipe terminal is liberated. This terminal is then moved to one side and then the coupling is slid from the supporting terminal. If, however, the coupling is employed in a location where axial movement is restricted, the outer clamping member may be entirely unscrewed from the inner clamping member, and then the inner clamping member 12, sleeve 21 and the interposed gasket 25 may be removed as a unit, and the outer clamping member 16 and its gasket 25 removed as a separate unit.

In Figure 5 a slightly modified form of the invention is depicted and in this form the outer terminal of the clamping member is split, as indicated at 36, so that a clamping bolt 37, which extends through lugs 38 carried by the split portion 39 of the clamping member, may clamp the split terminal of the clamping member to its supporting pipe section 11. Although only one clamping member has been shown, it is of course to be understood that each clamp member may be provided with a similar locking device.

In Figures 7 and 8 a modified sealing gasket is depicted, and this type of gasket is preferably formed of rubber or resilient composition. The gasket comprises an annular body 41 having frusto conical terminal surfaces 42 and 43 to be engaged by the frusto conical surfaces 19 of the clamping members and the frusto conical terminal surfaces 23 of the sleeves 21. As the clamping members are screwed towards each other, the angular disposition of the clamping surfaces 19, 21, 42 and 43 forces the resilient gasket inwardly against the outer peripheral surface of the engaged pipe section, thereby producing a water tight seal around the pipe at this point.

From the foregoing it is manifest that applicant has provided an exceedingly simple and positive pipe coupling that may be readily and conveniently applied to pipe lines, and its components so arranged that the separate sections of the pipe line are held in alinement while the clamping components are moved to clamping position. Although the entire loosely assembled coupling may be positioned on a pipe line, it is, of course, to be understood that in restricted locations the outer clamping member 16 and its gasket 25 are positioned on one pipe section, and the inner clamping member, sleeve 21 and the interposed gasket 25 are positioned on the opposed pipe sections. The pipe sections are then moved to axial alinement and the inner clamping member 12 and sleeve 21 are slid along the pipe sections until its intermediate portion is positioned at the joint or pipe terminals. In this position the sleeve 21 holds the separate pipe sections 10 and 11 in axial alinement so that the internal threads 17 of the outer clamping member 16 may be readily moved to threaded engagement with the external threads of the inner clamping member 12, and then the clamping members are moved relative to each other to securely clamp the coupling on the pipe line as hereinbefore disclosed.

A relatively inexpensive non-corrosive coupling is provided because the sealing action between the sealing gaskets 25 and the terminals of the non-corrosive sleeve 21 seals the fluid which is conveyed by the pipes within the pipes and sleeve to prevent this fluid from attacking and corroding the threaded or other portions of the outer clamping members.

Having thus described my invention, what I claim as new and useful is:

A pipe coupling including an unyieldable non-corrosive sleeve adapted to receive adjacent terminals of separate pipe sections therein, yieldable gaskets surrounding the pipe sections and located adjacent the terminals of the sleeve, a clamping device surrounding the sleeve and including separate threadedly connected sections having gasket engaging members whereby the movement of one section relative to the other causes the gasket engaging members to clamp the gaskets against the sleeve terminals and the pipe sections to so seal the device that fluid from within the pipe sections is sealed against escape beyond the inner confines of the sleeve to prevent corrosive fluid from within the pipe sections reaching the components of the clamping device.

JOHN E. SNYDER.